(12) United States Patent
Hsiao et al.

(10) Patent No.: US 9,229,650 B2
(45) Date of Patent: Jan. 5, 2016

(54) GRAPHICS PROCESSING METHOD FOR THREE-DIMENSIONAL IMAGES APPLIED TO FIRST BUFFER FOR STORING RIGHT-VIEW CONTENTS AND SECOND BUFFER FOR STORING LEFT-VIEW CONTENTS AND RELATED GRAPHICS PROCESSING APPARATUS THEREOF

(75) Inventors: Te-Chi Hsiao, Hsinchu (TW); Chin-Jung Yang, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 332 days.

(21) Appl. No.: 13/514,050

(22) PCT Filed: Dec. 22, 2010

(86) PCT No.: PCT/CN2010/080131
§ 371 (c)(1),
(2), (4) Date: Jun. 5, 2012

(87) PCT Pub. No.: WO2011/140810
PCT Pub. Date: Nov. 17, 2011

(65) Prior Publication Data
US 2012/0242663 A1 Sep. 27, 2012

Related U.S. Application Data

(60) Provisional application No. 61/333,785, filed on May 12, 2010.

(51) Int. Cl.
*G06T 15/00* (2011.01)
*G06F 3/06* (2006.01)
*G06T 19/00* (2011.01)

(52) U.S. Cl.
CPC ............ *G06F 3/0644* (2013.01); *G06F 3/0608* (2013.01); *G06F 3/0616* (2013.01); *G06F 3/0679* (2013.01); *G06T 19/00* (2013.01)

(58) Field of Classification Search
USPC ........................................................ 345/419
See application file for complete search history.

(56) References Cited

U.S. PATENT DOCUMENTS 5,451,981 A 9/1995 Drako
5,801,705 A * 9/1998 Kato et al. ..................... 345/419

(Continued)

FOREIGN PATENT DOCUMENTS

CN 101231835 A 7/2008
TW 564366 12/2003

OTHER PUBLICATIONS

"International Search Report" mailed on Mar. 17, 2011 for International application No. PCT/CN2010/080131, International filing date:Dec. 22, 2010.

*Primary Examiner* — Stephen R Koziol
*Assistant Examiner* — Terrell Robinson
(74) *Attorney, Agent, or Firm* — Winston Hsu; Scott Margo (57) ABSTRACT

A graphics processing method for three-dimensional images, applied to a first buffer for storing right-view contents and a second buffer for storing left-view contents, includes the following steps: sending drawing commands respectively related to the right-view contents and the left-view contents to a drawing engine; when a current Vsync status indicates that a display engine is not operating within a right Vsync period of a right-view frame, the drawing engine drawing the right-view contents stored in first buffer; when current Vsync status indicates that the display engine is not operating within a left Vsync period of a left-view frame, the drawing engine drawing the left-view contents stored in second buffer; during the right Vsync period of the right-view frame, the display engine displaying right-view contents stored in first buffer; and during the left Vsync period of the left-view frame, the display engine displaying left-view contents stored in second buffer.

16 Claims, 8 Drawing Sheets (56) References Cited

U.S. PATENT DOCUMENTS

| | | | | |
|---|---|---|---|---|
| 5,963,200 | A * | 10/1999 | Deering et al. | 345/213 |
| 7,061,459 | B2 * | 6/2006 | Koizumi | 345/94 |
| 2002/0186213 | A1 | 12/2002 | Koizumi | |
| 2003/0103062 | A1 * | 6/2003 | Lee et al. | 345/629 |
| 2008/0170274 | A1 * | 7/2008 | Lee | 358/474 |
| 2008/0204464 | A1 * | 8/2008 | Roh | 345/531 |
| 2010/0104262 | A1 * | 4/2010 | Kanamaru et al. | 386/95 |
| 2010/0128044 | A1 * | 5/2010 | Yu | 345/545 |
| 2010/0306584 | A1 * | 12/2010 | Nishimura et al. | 714/15 |

* cited by examiner

GRAPHICS PROCESSING METHOD FOR THREE-DIMENSIONAL IMAGES APPLIED TO FIRST BUFFER FOR STORING RIGHT-VIEW CONTENTS AND SECOND BUFFER FOR STORING LEFT-VIEW CONTENTS AND RELATED GRAPHICS PROCESSING APPARATUS THEREOF

TECHNICAL FIELD

The present disclosure relates to three-dimensional image processing, and more particularly, to a graphics processing method for three-dimensional images that is applied to a first buffer for storing right-view contents and a second buffer for storing left-view contents to avoid tearing effects and related graphics processing apparatus thereof.

BACKGROUND

Recently, three-dimensional topics, such as three-dimensional films or three-dimensional televisions, are getting more and more popular. In three-dimensional specification, right-view frames and left-view frames are interleaved in order to form three-dimensional images.

In general, both the right-view frames and the left-view frames have their own dedicated buffers to store respective contents. For a single-buffer mode in three-dimensional specification, both of the right-view frames and the left-view frames need a buffer served as an on-drawing buffer for drawing their respective contents and an on-screen buffer for displaying their respective contents by turns. That is to say, the right-view frames need a right-view buffer served for drawing and displaying the right-view contents by turns, and the left-view frames need a left-view buffer served for drawing and displaying the left-view contents by turns. However, since only one buffer is adopted to draw and display respective contents for each of the right-view frames and the left-view frames in the single-buffer mode, the unwanted "tearing effect" may be easily perceived by the user. "Tearing effect" is a visual artifact in video where information from two or more different frames is shown on a display device in a single screen draw. The artifact occurs when the video feed sent to the device isn't synchronous with the display's refresh, be it due to non-matching refresh rates, or simply lack of synchronization between the two. During video motion, "tearing effect" creates a torn look as edges of objects (such as a wall or a tree) fail to line up.

Hence, how to improve the viewing experience of the three-dimensional images and how to avoid the tearing effect, especially for single-buffer mode in three-dimensional specification, have become an important issue to be solved by designers in this field.

SUMMARY

It is one of the objectives of the claimed disclosure to provide a graphics processing method for three-dimensional images and a related graphics processing apparatus thereof to solve the above-mentioned problems.

According to one aspect of the present disclosure, an exemplary graphics processing method for three-dimensional images applied to a first buffer for storing right-view contents and a second buffer for storing left-view contents is provided. The exemplary method includes the following steps: sending drawing commands respectively related to the right-view contents and the left-view contents to a drawing engine; when a current vertical synchronization (Vsync) status indicates that a display engine is not operating within a right Vsync period of a right-view frame, the drawing engine drawing the right-view contents stored in the first buffer; when the current Vsync status indicates that the display engine is not operating within a left Vsync period of a left-view frame, the drawing engine drawing the left-view contents stored in the second buffer; during the right Vsync period of the right-view frame, the display engine displaying the right-view contents stored in the first buffer; and during the left Vsync period of the left-view frame, the display engine displaying the left-view contents stored in the second buffer.

According to another aspect of the present disclosure, an exemplary graphics processing apparatus for three-dimensional images is provided. The exemplary graphics processing apparatus includes a first buffer, a second buffer, a processor, a display engine, and a display engine. The first buffer is arranged to store right-view contents. The second buffer is arranged to store left-view contents. The processor is arranged to send drawing commands respectively related to the right-view contents and the left-view contents. The display engine is coupled to the first buffer and the second buffer, and is arranged to display the right-view contents stored in the first buffer during a right Vsync period of a right-view frame, and arranged to display the left-view contents stored in the second buffer during a left Vsync period of a left-view frame. The drawing engine is coupled to the first buffer, the second buffer, the processor, and the display engine, and is arranged to draw the right-view contents stored in the first buffer when a current Vsync status indicates that the display engine is not operating within the right Vsync period of the right-view frame, and arranged to draw the left-view contents stored in the second buffer when the current Vsync status indicates that the display engine is not operating within the left Vsync period of the left-view frame.

By controlling the drawing engine to draw the right-view contents stored in the first buffer when the current Vsync status indicates that the display engine is not operating within the right Vsync period of the right-view frame, or by controlling the drawing engine to draw the left-view contents stored in the second buffer when the current Vsync status indicates that the display engine is not operating within the left Vsync period of the left-view frame, the unwanted tearing effect can be avoided or mitigated.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
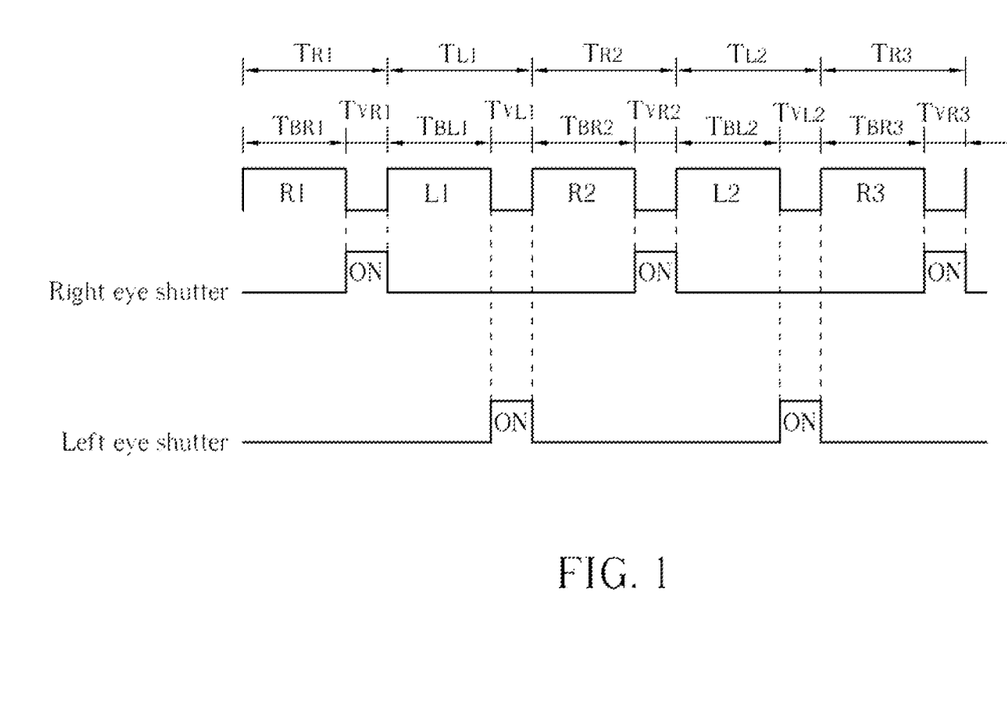
FIG. 1 is a timing diagram illustrating a timing sequence for processing a right-view frame and a left-view frame of three-dimensional images.

FIG. 1 is a timing diagram illustrating a timing sequence for processing a right-view frame and a left-view frame of three-dimensional images. As shown in FIG. 1, right-view frames (e.g., R1, R2, R3, etc) and left-view frames (e.g., L1, L2, etc.) are interleaved in order to form three-dimensional images. That is to say, a right-view frame R1 intended for being viewed by a right eye is sent first. Thereafter, there is a pause in transmission called a right Vsync (vertical synchronization). Next, a left-view frame L1 intended for being viewed by a left eye is sent. Thereafter, there is another pause in transmission called a left Vsync. As shown in FIG. 1, a period of each right-view frame includes a first non-display period as well as a right Vsync period for displaying right-view contents; similarly, a period of each left-view frame includes a second non-display period as well as a left Vsync period for displaying left-view contents. As an illustration, the period of the right-view frame TR1 includes the first non-display period TBR1 and the right Vsync period TVR1; the period of the right-view frame TR2 includes the first non-display period TBR2 and the right Vsync period TVR2; and so on. The period of the left-view frame TL1 includes the second non-display period TBL1 and the left Vsync period TVL1; the period of the left-view frame TL2 includes the second non-display period TBL2 and the left Vsync period TVL2; and so on.

Please note that the above-mentioned first non-display period (e.g., TBR1, TBR2 or TBR3) indicates a period that the right-view contents have been sent but have not been displayed on a display device (e.g., an LCD monitor or a TV) yet, while the above-mentioned second non-display period (e.g., TBL1 or TBL2) indicates a period that the left-view contents have been sent but have not been displayed on the display device yet. Furthermore, the above-mentioned right Vsync period (e.g., TVR1, TVR2 or TVR3) indicates a period that the right-view contents are displayed on the display device, while the above-mentioned left Vsync period (e.g., TVL1 or TVL2) indicates a period that the left-view contents are displayed on the display device.

In addition, stereo glasses equipped with right eye shutters and left eye shutters may be employed to ensure that proper eye views the appropriate frame. Thus, during the right Vsync period that the right-view contents (e.g., R1, R2 or R3) are displayed on the display device, the right eye shutter is controlled to be maintained in an open status (during which the left eye shutter is maintained in a close status); and during the left Vsync period that the left-view contents (e.g., L1 or L2) are displayed on the display device, the left eye shutter is controlled to be maintained in the open status (during which the right eye shutter is maintained in the close status).

Figure 2A:
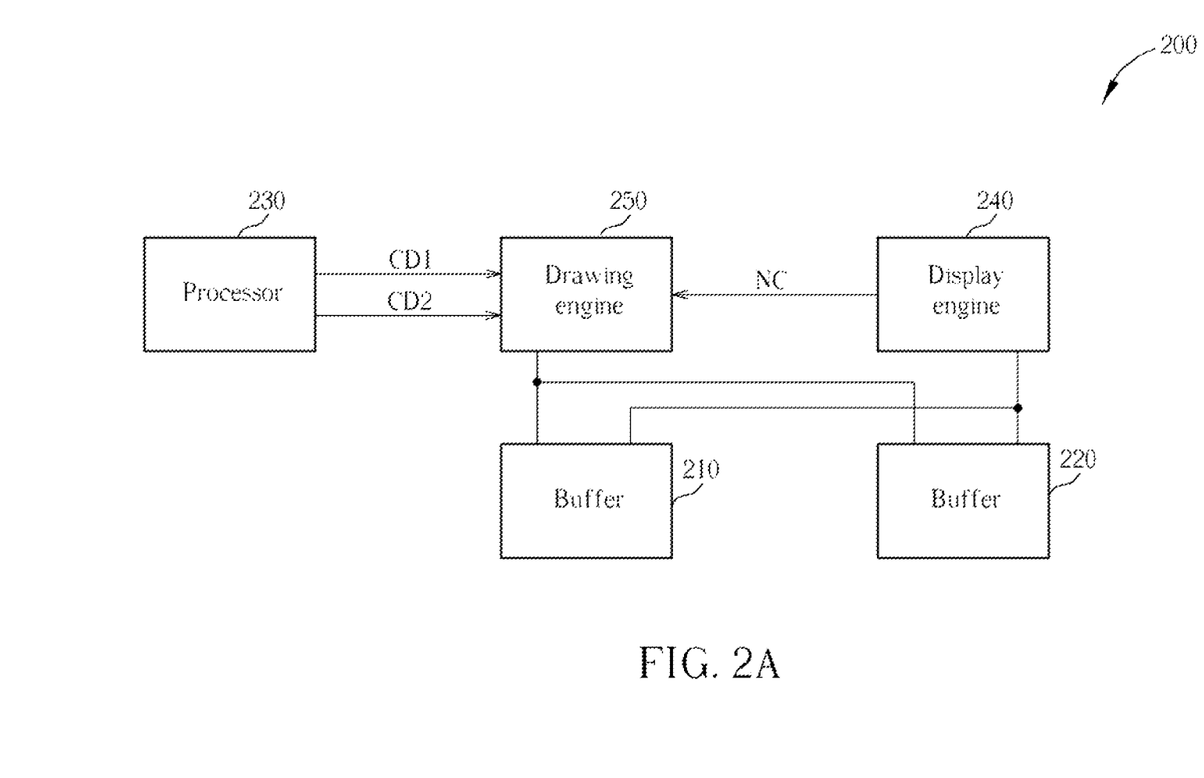
FIG. 2A is a block diagram illustrating an architecture of a graphics processing apparatus for three-dimensional images according to a first embodiment of the present disclosure.

FIG. 2A is a block diagram illustrating an architecture of a graphics processing apparatus for three-dimensional images according to a first embodiment of the present disclosure. As shown in FIG. 2A, the graphics processing apparatus 200 includes, but is not limited to, two buffers 210 and 220, a processor 230, a display engine 240, and a drawing engine 250. In this embodiment, the buffer 210 is arranged to store right-view contents and serve as an on-drawing buffer and an on-screen buffer related to the right-view contents by turns; while the buffer 220 is arranged to store left-view contents and serve as an on-drawing buffer and an on-screen buffer related to the left-view contents by turns. This can also be called a single-buffer mode for three-dimensional images. That is to say, during a current stage, the buffer 210 may serve as an on-screen buffer related to the right-view contents and the buffer 220 may serve as an on-drawing buffer related to the left-view contents; during a next stage, the buffer 210 may serve as an on-drawing buffer related to the right-view contents and the buffer 220 may serve as an on-screen buffer related to the left-view contents; and so forth. Please note that the buffers 210 and 220 may be separate memories or a common memory including separate memory areas dedicated to storing the right-view contents and left-view contents respectively. Operations of the processor 230, the drawing engine 250, and the display engine 240 will be detailed as follows.

Please note that, in this embodiment, the processor 230 is arranged to send drawing commands CD1 related to the right-view contents and drawing commands CD2 related to the left-view contents to the drawing engine 250. The drawing engine 250 is coupled to the buffers 210 and 220, the processor 230, and the display engine 240. The display engine 240 is coupled to the buffers 210 and 220 and the drawing engine 250, and is arranged to display the right-view contents stored in the buffer 210 during a right Vsync period (e.g., TVR1, TVR2 or TVR3 shown in FIG. 1) of a right-view frame (e.g., R1, R2 or R3 shown in FIG. 1), and arranged to display the left-view contents stored in the buffer 220 during a left Vsync period (e.g., TVL1 or TVL2 shown in FIG. 1) of a left-view frame (e.g., L1 or L2 shown in FIG. 1). In this embodiment, the display engine 240 is further arranged to send a notice NC to notify the drawing engine 250 of a current Vsync status.

What calls for special attention is that: the drawing engine 250 is arranged to draw the right-view contents stored in the buffer 210 when the current Vsync status indicates that the display engine 240 is not operating within the right Vsync period (e.g., TVR1, TVR2 or TVR3 shown in FIG. 1) of the right-view frame (e.g., R1, R2 or R3 shown in FIG. 1), and arranged to draw the left-view contents stored in the buffer 220 when the current Vsync status indicates that the display engine 240 is not operating within the left Vsync period (e.g., TVL1 or TVL2 shown in FIG. 1) of the left-view frame (e.g., L1 or L2 shown in FIG. 1).

In another embodiment, the drawing engine 250 may draw the right-view contents stored in the buffer 210 during the second non-display period (e.g., TBL1 or TBL2 shown in FIG. 1). In another embodiment, the drawing engine 250 may draw the right-view contents stored in the buffer 210 during the left Vsync period (e.g., TVL1 or TVL2 shown in FIG. 1) of the left-view frame. In yet another embodiment, the drawing engine 250 may draw the right-view contents stored in the buffer 210 during the period of the left-view frame (e.g., TL1 or TL2 shown in FIG. 1).

Similarly, in one embodiment, the drawing engine 250 may draw the left-view contents stored in the buffer 220 during the first non-display period (e.g., TBR1, TBR2 or TBR3 shown in FIG. 1). In another embodiment, the drawing engine 250 may draw the left-view contents stored in the buffer 220 during the right Vsync period (e.g., TVR1, TVR2 or TVR3 shown in FIG. 1) of the right-view frame right Vsync period. In yet another embodiment, the drawing engine 250 may draw the left-view contents stored in the buffer 220 during a period of the right-view frame (e.g., TR1, TR2 or TR3 shown in FIG. 1).

Those skilled in the art should readily appreciate that various modifications or various combinations of the drawing timing that the drawing engine 250 draws the right-view contents and the left-view contents may be made without departing from the spirit of the present disclosure. For example, the term "during the first non-display period" or the term "during the second non-display period" is not limited to cover the whole period, and can also be explained as "during a part of the first non-display period" or "during a part of the second non-display period", respectively, which also belongs to the scope of the present disclosure. In other words, only when the current Vsync status indicates that the display engine 240 is not operating within the right Vsync period of the right-view frame, the drawing engine 250 is allowed to draw the right-view contents stored in the buffer 210; and only when the current Vsync status indicates that the display engine 240 is not operating within the left Vsync period of the left-view frame, the drawing engine 250 is allowed to draw the left-view contents stored in the buffer 220.

Figure 2B:
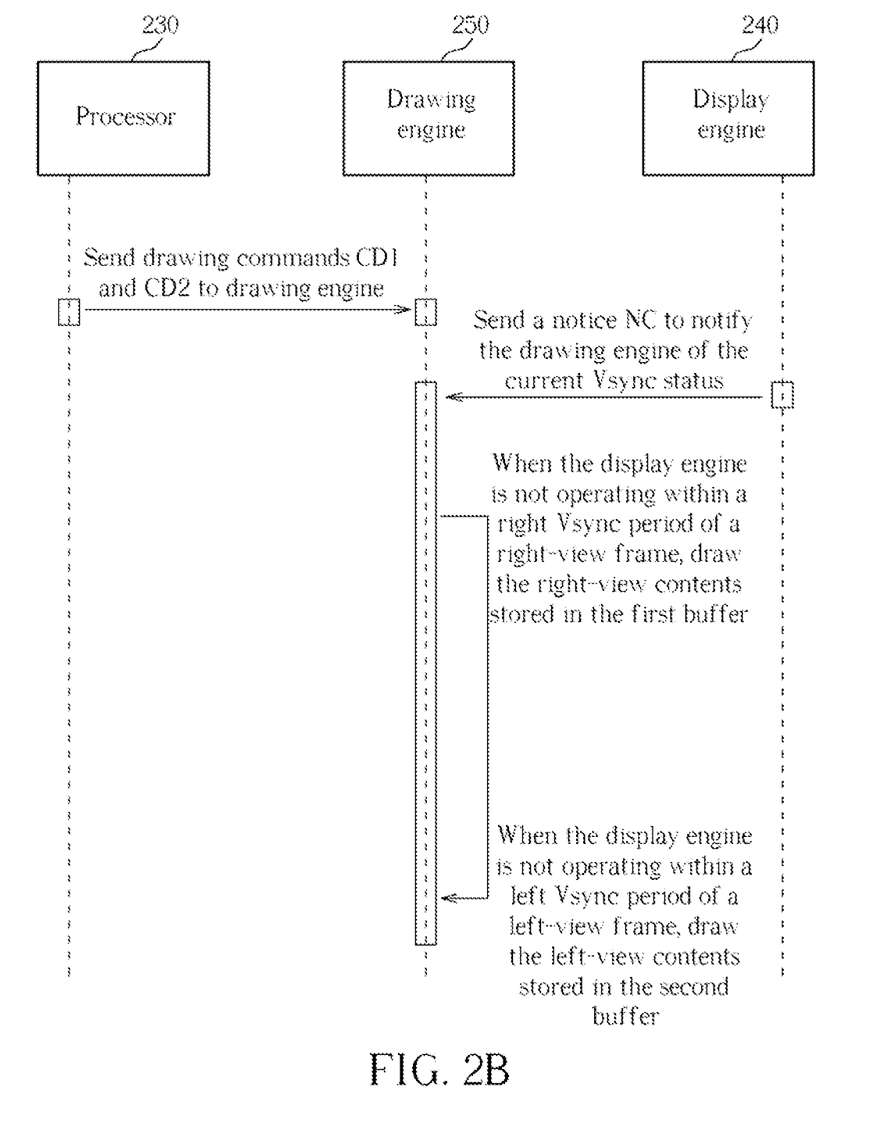
FIG. 2B is a diagram illustrating a single-buffer procedure for dealing with three-dimensional images according to a first embodiment of the present disclosure.

Please refer to FIG. 2A together with FIG. 2B. FIG. 2B is a diagram illustrating a single-buffer procedure for dealing with three-dimensional images according to a first embodiment of the present disclosure. In FIG. 2B, the processor 230 sends drawing commands CD1 related to the right-view contents and drawing commands CD2 related to the left-view contents to the drawing engine 250. After that, the display engine 240 sends a notice NC to notify the drawing engine 250 of a current Vsync status. In a first case, the buffer 210 may serve as an on-screen buffer related to the right-view contents and the buffer 220 may serve as an on-drawing buffer related to the left-view contents, at this time, the current Vsync status thereby indicates that the display engine 240 is not operating within the left Vsync period of the left-view frame. Under this condition, the drawing engine 250 draws the left-view contents stored in the buffer 220. In a second case, the buffer 210 may serve as an on-drawing buffer related to the right-view contents and the buffer 220 may serve as an on-screen buffer related to the left-view contents, at this time, the current Vsync status thereby indicates that the display engine 240 is not operating within the right Vsync period of the right-view frame. Under this condition, the drawing engine 250 draws the right-view contents stored in the buffer 210.

The drawing timing is controlled in order to avoid "tearing effect" that the drawing engine 250 draws the right-view contents and the left-view contents. In this embodiment, the display engine 240 sends the notice NC to notify the drawing engine 250 of the current Vsync status automatically and directly, and then the drawing engine 250 can determine the drawing time for drawing the right-view contents stored in the buffer 210 or the left-view contents stored in the buffer 220 according to the current Vsync status. In this way, the tearing effect can be avoided or mitigated in the single-buffer procedure for dealing with three-dimensional images.

Figure 3A:
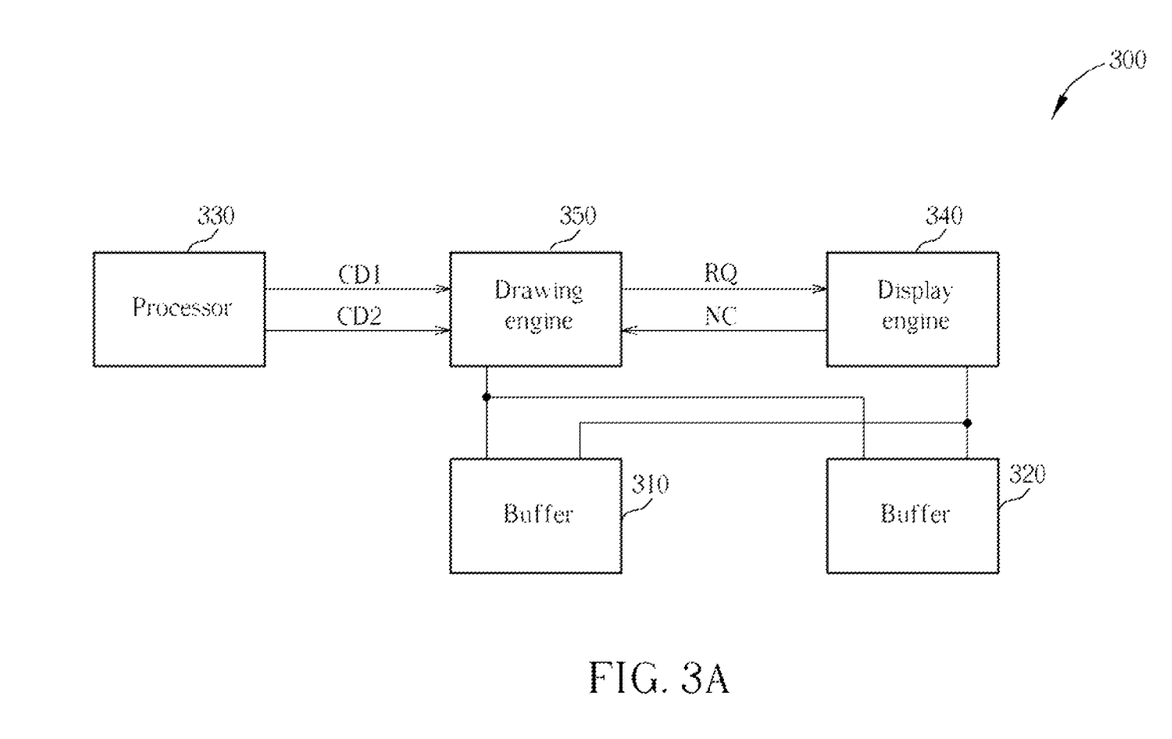
FIG. 3A is a block diagram illustrating an architecture of a graphics processing apparatus for three-dimensional images according to a second embodiment of the present disclosure.

FIG. 3A is a block diagram illustrating an architecture of a graphics processing apparatus for three-dimensional images according to a second embodiment of the present disclosure. As shown in FIG. 3A, the graphics processing apparatus 300 includes, but is not limited to, two buffers 310 and 320, a processor 330, a display engine 340, and a drawing engine 350. In this embodiment, the buffer 310 is arranged to store right-view contents and serve as an on-drawing buffer and an on-screen buffer related to the right-view contents by turns; while the buffer 320 is arranged to store left-view contents and serve as an on-drawing buffer and an on-screen buffer related to the left-view contents by turns. This can also be called a single-buffer mode for three-dimensional images. That is to say, during a current stage, the buffer 310 may serve as an on-screen buffer related to the right-view contents and the buffer 320 may serve as an on-drawing buffer related to the left-view contents; during a next stage, the buffer 310 may serve as an on-drawing buffer related to the right-view contents and the buffer 320 may serve as an on-screen buffer related to the left-view contents; and so forth.

The architecture of the graphics processing apparatus 300 shown in FIG. 3A is similar to that of the graphics processing apparatus 200 shown in FIG. 2A, and the major difference is that: in this embodiment shown in FIG. 3A, the drawing engine 350 is further arranged to actively send a request RQ to the display engine 340 in order to check the current Vsync status, and the display engine 340 is arranged to send a notice NC to notify the drawing engine 350 of the current Vsync status in response to the request RQ. Operations of the processor 330, the drawing engine 350, and the display engine 340 will be detailed as follows.

Figure 3B:
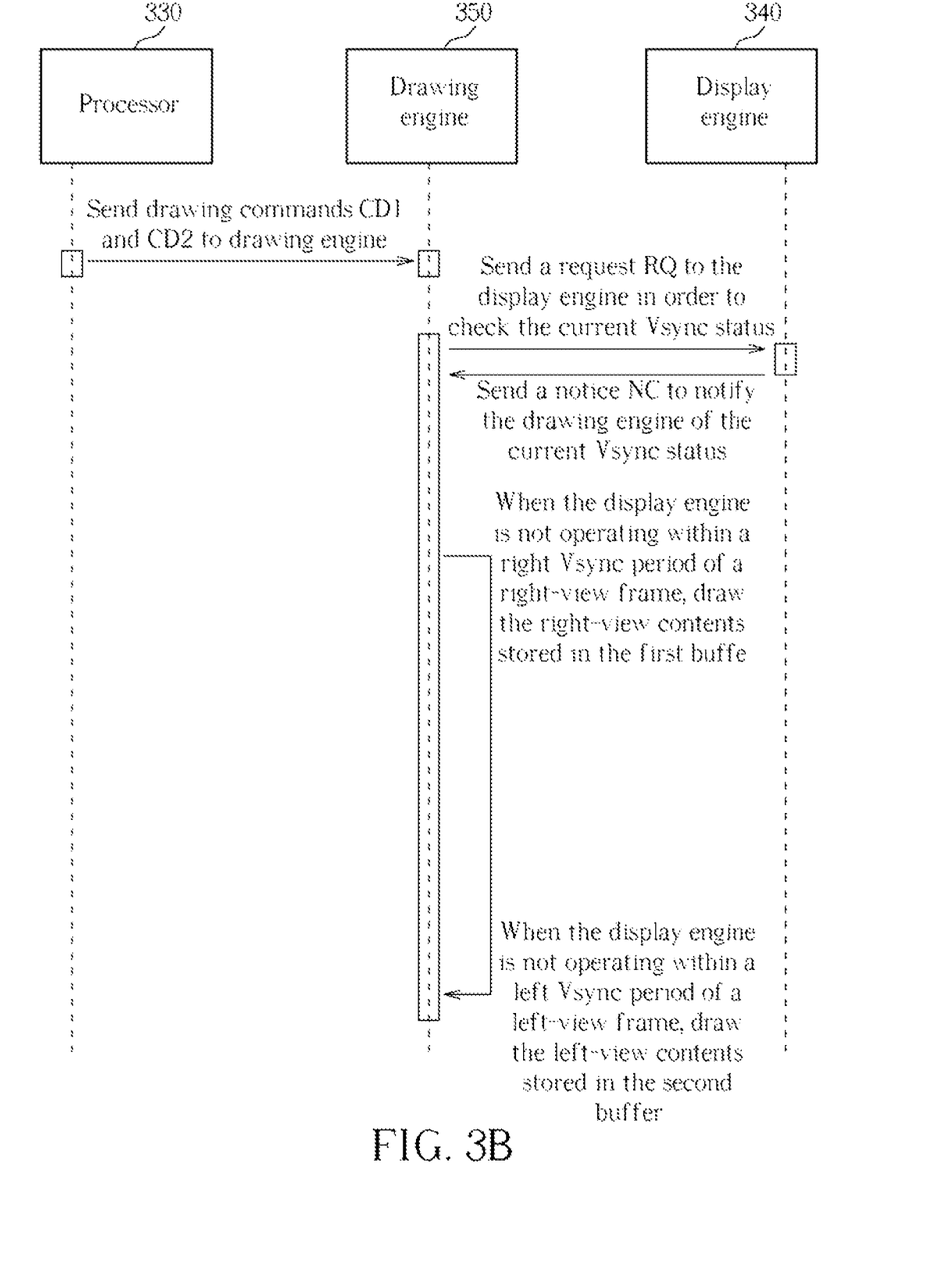
FIG. 3B is a diagram illustrating a single-buffer procedure for dealing with three-dimensional images according to a second embodiment of the present disclosure.

Please refer to FIG. 3A together with FIG. 3B. FIG. 3B is a diagram illustrating a single-buffer procedure for dealing with three-dimensional images according to a second embodiment of the present disclosure. In FIG. 3B, the processor 330 sends drawing commands CD1 related to the right-view contents and drawing commands CD2 related to the left-view contents to the drawing engine 350. After that, the drawing engine 350 sends a request RQ to the display engine 340 in order to check the current Vsync status, and the display engine 340 then sends a notice NC to notify the drawing engine 350 of the current Vsync status in response to the request RQ. In a first case, the buffer 310 may serve as an on-screen buffer related to the right-view contents and the buffer 320 may serve as an on-drawing buffer related to the left-view contents, at this time, the current Vsync status thereby indicates that the display engine 340 is not operating within the left Vsync period of the left-view frame. Under this condition, the drawing engine 350 draws the left-view contents stored in the buffer 320. In a second case, the buffer 310 may serve as an on-drawing buffer related to the right-view contents and the buffer 320 may serve as an on-screen buffer related to the left-view contents, at this time, the current Vsync status thereby indicates that the display engine 340 is not operating within the right Vsync period of the right-view frame. Under this condition, the drawing engine 350 draws the right-view contents stored in the buffer 310.

The drawing timing is controlled in order to avoid the unwanted "tearing effect" that the drawing engine 250 draws the right-view contents and the left-view contents. In this embodiment, the drawing engine 350 sends the request RQ to the display engine 340 in order to check the current Vsync status, and then the drawing engine 350 can determine the drawing time for drawing the right-view contents stored in the buffer 310 or the left-view contents stored in the buffer 320 according to the current Vsync status. In this way, the tearing effect can be avoided or mitigated in the single-buffer procedure for dealing with three-dimensional images.

Please note that the above-mentioned graphics processing apparatus 200/300 may be implemented in a television or a Blu-ray (BD) player, but the present disclosure is not limited to this only. In addition, each of the drawing engine 250/350 and the display engine 240/340 may be implemented by pure hardware, software or a combination of thereof (e.g., firmware executed by a microprocessor). Those skilled in the art should readily appreciate that various modifications of achieving the functions of the drawing engine 250/350 and the display engine 240/340 shown in FIG. 2A or FIG. 3A may be made without departing from the spirit of the present disclosure.

Figure 4:
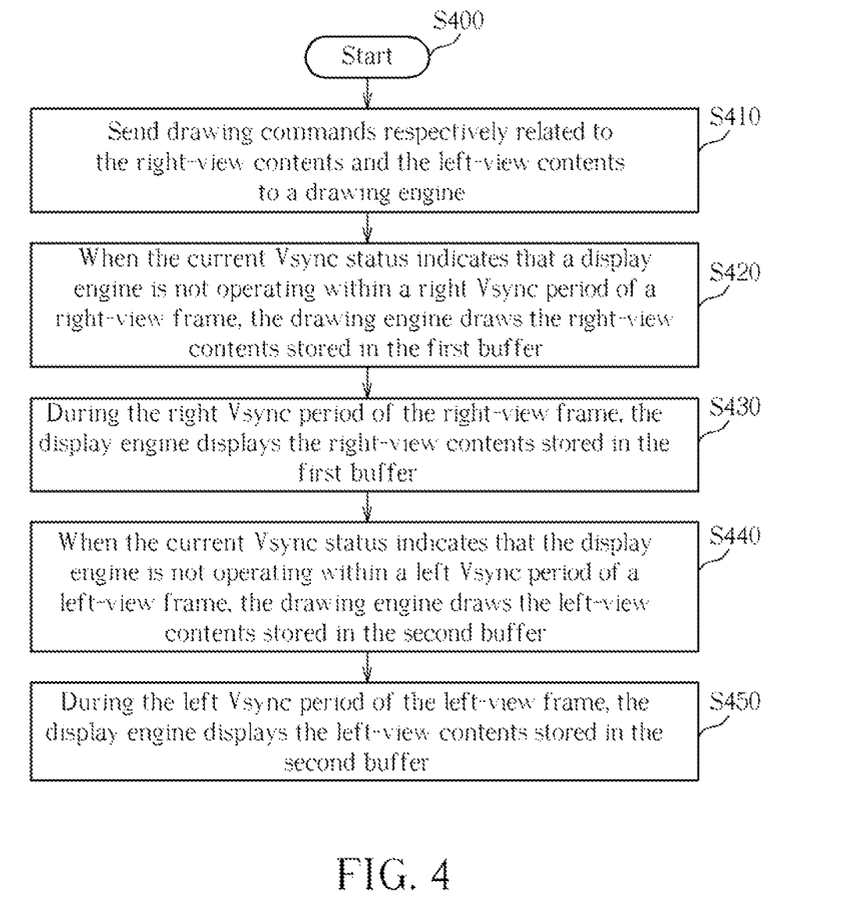
FIG. 4 is a flowchart illustrating a graphics processing method for three-dimensional images according to an exemplary embodiment of the present disclosure.

FIG. 4 is a flowchart illustrating a graphics processing method for three-dimensional images according to an exemplary embodiment of the present disclosure. Please note that the steps are not required to be executed in the exact order shown in FIG. 4, provided that the result is substantially the same. The generalized graphics processing method may include the following steps:

Step S400: Start.

Step S410: Send drawing commands respectively related to the right-view contents and the left-view contents to a drawing engine.

Step S420: When the current Vsync status indicates that a display engine is not operating within a right Vsync period of a right-view frame, the drawing engine draws the right-view contents stored in the first buffer.

Step S430: During the right Vsync period of the right-view frame, the display engine displays the right-view contents stored in the first buffer.

Step S440: When the current Vsync status indicates that the display engine is not operating within a left Vsync period of a left-view frame, the drawing engine draws the left-view contents stored in the second buffer.

Step S450: During the left Vsync period of the left-view frame, the display engine displays the left-view contents stored in the second buffer.

As a person skilled in the art can readily understand the details of the steps in FIG. 4 after reading above paragraphs directed to the graphics processing apparatuses 100 and 200, further description is omitted here for brevity. What calls for special attention is that the steps of the flowchart shown in FIG. 4 can be used in a single-buffer procedure for three-dimensional images. Here, the steps S410 can be executed by the processor 230/330; the steps S420 and S440 can be executed by the drawing engine 250/350; and the steps S430 and S450 can be executed by the display engine 240/340.

Figure 5:
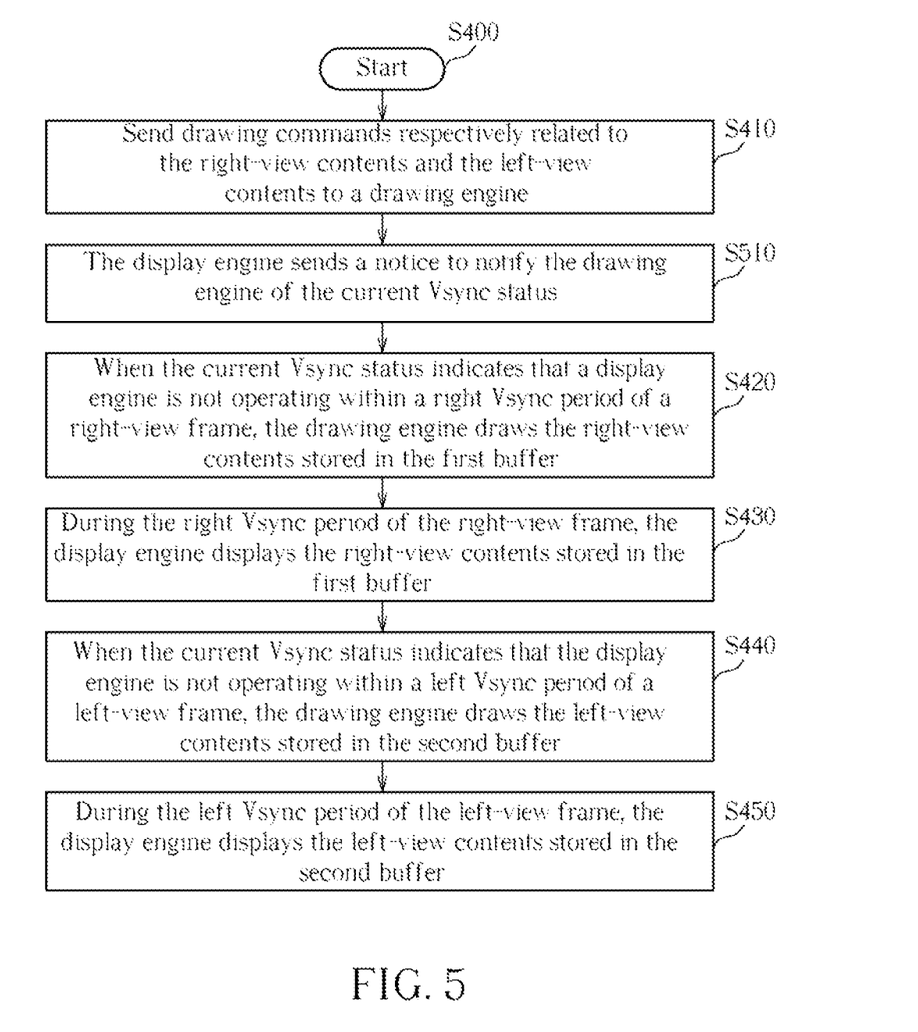
FIG. 5 is a flowchart illustrating a graphics processing method for three-dimensional images according to another exemplary embodiment of the present disclosure.

FIG. 5 is a flowchart illustrating a graphics processing method for three-dimensional images according to another exemplary embodiment of the present disclosure. Please note that the steps are not required to be executed in the exact order shown in FIG. 5, provided that the result is substantially the same. The generalized graphics processing method may include the following steps:

Step S400: Start.

Step S410: Send drawing commands respectively related to the right-view contents and the left-view contents to a drawing engine.

Step S510: The display engine sends a notice to notify the drawing engine of the current Vsync status.

Step S420: When the current Vsync status indicates that a display engine is not operating within a right Vsync period of a right-view frame, the drawing engine draws the right-view contents stored in the first buffer.

Step S430: During the right Vsync period of the right-view frame, the display engine displays the right-view contents stored in the first buffer.

Step S440: When the current Vsync status indicates that the display engine is not operating within a left Vsync period of a left-view frame, the drawing engine draws the left-view contents stored in the second buffer.

Step S450: During the left Vsync period of the left-view frame, the display engine displays the left-view contents stored in the second buffer.

The steps shown in FIG. 5 are similar to that shown in FIG. 4, and the major difference therebetween is that: the flowchart shown in FIG. 5 further includes a step which uses the display engine to send a notice to notify the drawing engine of the current Vsync status (i.e., step S510). How each element operates can be readily known by collocating the steps shown in FIG. 5 together with the elements shown in FIG. 2A and the single-buffer procedure for dealing with three-dimensional images shown in FIG. 2B, and further description is therefore omitted here for brevity. Be noted that the step S510 can be executed by the display engine 240.

Figure 6:
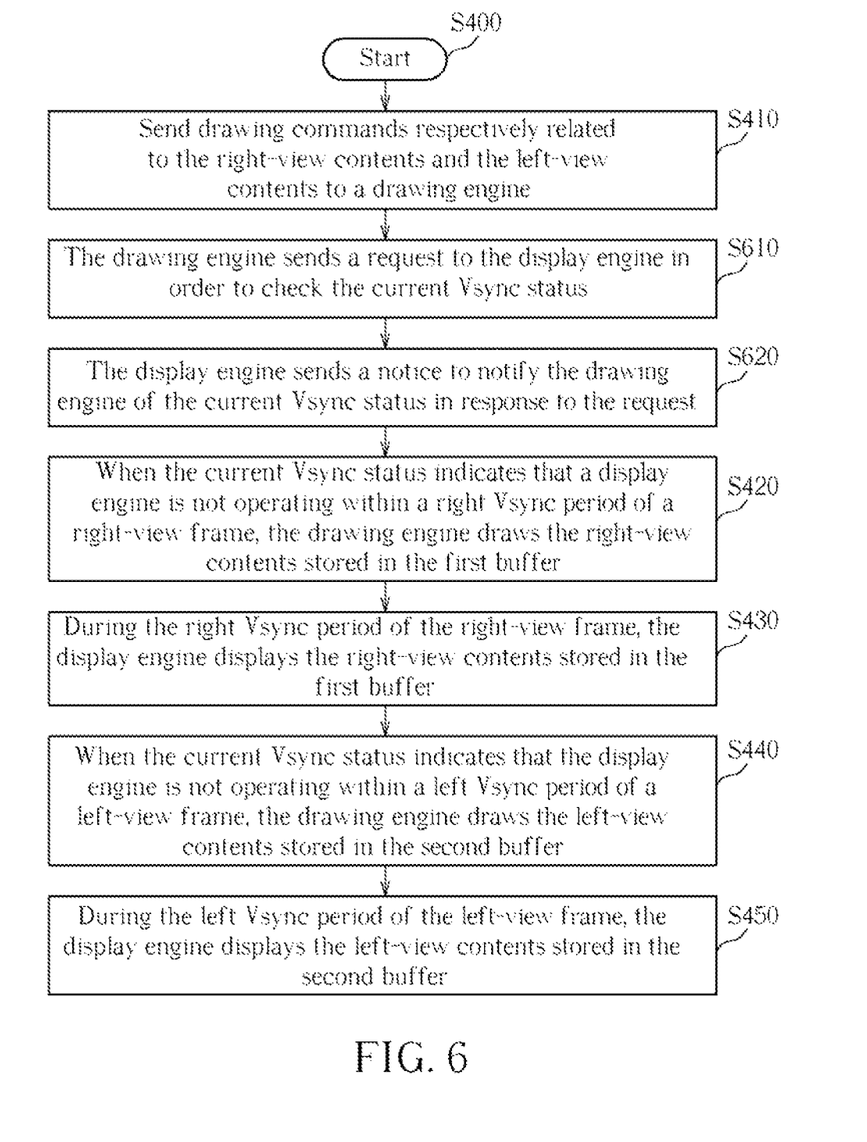
FIG. 6 is a flowchart illustrating a graphics processing method for three-dimensional images according to yet another exemplary embodiment of the present disclosure.

FIG. 6 is a flowchart illustrating a graphics processing method for three-dimensional images according to yet another exemplary embodiment of the present disclosure. Please note that the steps are not required to be executed in the exact order shown in FIG. 6, provided that the result is substantially the same. The generalized graphics processing method may include following steps:

Step S400: Start.

Step S410: Send drawing commands respectively related to the right-view contents and the left-view contents to a drawing engine.

Step S610: The drawing engine sends a request to the display engine in order to check the current Vsync status.

Step S620: The display engine sends a notice to notify the drawing engine of the current Vsync status in response to the request.

Step S420: When the current Vsync status indicates that a display engine is not operating within a right Vsync period of a right-view frame, the drawing engine draws the right-view contents stored in the first buffer.

Step S430: During the right Vsync period of the right-view frame, the display engine displays the right-view contents stored in the first buffer.

Step S440: When the current Vsync status indicates that the display engine is not operating within a left Vsync period of a left-view frame, the drawing engine draws the left-view contents stored in the second buffer.

Step S450: During the left Vsync period of the left-view frame, the display engine displays the left-view contents stored in the second buffer.

The steps shown in FIG. 6 are similar to that shown in FIG. 4, and the major difference therebetween is that: the flowchart shown in FIG. 6 further include two steps which use the drawing engine to send a request to the display engine in order to check the current Vsync status and use the display engine to send a notice to notify the drawing engine of the current Vsync status (i.e., steps S610 and S620). How each element operates can be readily known by collocating the steps shown in FIG. 6 together with the elements shown in FIG. 3A and the single-buffer procedure for dealing with three-dimensional images shown in FIG. 3B, and further description is therefore omitted here for brevity. Be noted that the step S610 can be executed by the drawing engine 350, and the step S620 can be executed by the display engine 340.

Please note that, the steps of the above-mentioned flowcharts are merely practicable embodiments of the present disclosure, and in no way should be considered to be limitations of the scope of the present disclosure. These exemplary methods may include other intermediate steps, or several steps can be merged into a single step, or the above-mentioned steps can be slightly modified without departing from the spirit of the present disclosure. By way of example, in one embodiment, the step S420 can be implemented by drawing the right-view contents stored in the first buffer during the second non-display period; in another embodiment, the step S420 can be implemented by drawing the right-view contents stored in the first buffer during the left Vsync period of the left-view frame; in yet another embodiment, the step S420 may be implemented by drawing the right-view contents stored in the first buffer during a period of the left-view frame. Similarly, the step S440 can be implemented by drawing the left-view contents stored in the second buffer during the first non-display period; in another embodiment, the step S440 can be implemented by drawing the left-view contents stored in the second buffer during the right Vsync period of the right-view frame; in yet another embodiment, the step S440 can be implemented by drawing the left-view contents stored in the second buffer during a period of the right-view frame.

The above-mentioned embodiments are presented merely for describing features of the present disclosure, and in no way should be considered to be limitations of the scope of the present disclosure. In summary, the present disclosure provides a graphics processing method for three-dimensional images and a related graphics processing apparatus. By controlling the drawing engine 250/350 to draw the right-view contents stored in the buffer 210/310 when the current Vsync status indicates that the display engine 240/340 is not operating within the right Vsync period of the right-view frame, or by controlling the drawing engine 250/350 to draw the left-view contents stored in the buffer 220/320 when the current Vsync status indicates that the display engine 240/340 is not operating within the left Vsync period of the left-view frame, the unwanted tearing effect can be avoided or mitigated. In this way, the viewing performance of the graphics processing apparatus 200/300 can be improved under a single-buffer mode for dealing with three-dimensional images.

The invention claimed is:

1. A graphics processing method for three-dimensional images, applied to a first buffer for storing right-view contents and a second buffer for storing left-view contents in a single-buffer mode, the method comprising:
    sending drawing commands respectively related to the right-view contents and the left-view contents to a drawing engine;
    only when a current vertical synchronization (Vsync) status indicates that a display engine is not operating within a right Vsync period of a right-view frame, the drawing engine drawing the right-view contents stored in the first buffer;
    only when the current Vsync status indicates that the display engine is not operating within a left Vsync period of a left-view frame, the drawing engine drawing the left-view contents stored in the second buffer;
    during the right Vsync period of the right-view frame, the display engine displaying the right-view contents stored in the first buffer; and
    during the left Vsync period of the left-view frame, the display engine displaying the left-view contents stored in the second buffer.

2. The graphics processing method for three-dimensional images of claim 1, further comprising:
    the display engine sending a notice to notify the drawing engine of the current Vsync status.

3. The graphics processing method for three-dimensional images of claim 1, further comprising:
    the drawing engine sending a request to the display engine in order to check the current Vsync status;
    the display engine sending a notice to notify the drawing engine of the current Vsync status in response to the request.

4. The graphics processing method for three-dimensional images of claim 1, wherein a period of the right-view frame comprises a first non-display period and the right Vsync period of the right-view frame for displaying the right-view contents stored in the first buffer; and a period of the left-view frame comprises a second non-display period and the left Vsync period of the left-view frame for displaying the left-view contents stored in the second buffer.

5. The graphics processing method for three-dimensional images of claim 4, wherein the step of the drawing engine drawing the right-view contents stored in the first buffer comprises:
    during the second non-display period, the drawing engine drawing the right-view contents stored in the first buffer; or
    during the left Vsync period of the left-view frame, the drawing engine drawing the right-view contents stored in the first buffer.

6. The graphics processing method for three-dimensional images of claim 4, wherein the step of the drawing engine drawing the right-view contents stored in the first buffer comprises:
    during the period of the left-view frame, the drawing engine drawing the right-view contents stored in the first buffer.

7. The graphics processing method for three-dimensional images of claim 4, wherein the step of the drawing engine drawing the left-view contents stored in the second buffer comprises:
    during the first non-display period, the drawing engine drawing the left-view contents stored in the second buffer; or
    during the right Vsync period of the right-view frame, the drawing engine drawing the left-view contents stored in the second buffer.

8. The graphics processing method for three-dimensional images of claim 4, wherein the step of the drawing engine drawing the left-view contents stored in the second buffer comprises:
    during the period of the right-view frame, the drawing engine drawing the left-view contents stored in the second buffer.

9. A graphics processing apparatus for three-dimensional images, comprising:
    a first buffer, arranged to store right-view contents in a single-buffer mode;
    a second buffer, arranged to store left-view contents in the single-buffer mode;
    a processor, arranged to send drawing commands respectively related to the right-view contents and the left-view contents;
    a display engine, coupled to the first buffer and the second buffer, arranged to display the right-view contents stored in the first buffer during a right Vsync period of a right-view frame, and arranged to display the left-view contents stored in the second buffer during a left Vsync period of a left-view frame; and
    a drawing engine, coupled to the first buffer, the second buffer, the processor, and the display engine, arranged to draw the right-view contents stored in the first buffer only when a current Vsync status indicates that the display engine is not operating within the right Vsync period of the right-view frame, and arranged to draw the left-view contents stored in the second buffer only when the current Vsync status indicates that the display engine is not operating within the left Vsync period of the left-view frame.

10. The graphics processing apparatus for three-dimensional images of claim 9, wherein the display engine is further arranged to send a notice to notify the drawing engine of the current Vsync status.

11. The graphics processing apparatus for three-dimensional images of claim 9, wherein the drawing engine is further arranged to send a request to the display engine in order to check the current Vsync status; and the display engine is further arranged to send a notice to notify the drawing engine of the current Vsync status in response to the request.

12. The graphics processing apparatus for three-dimensional images of claim 9, wherein a period of the right-view frame comprises a first non-display period and the right Vsync period of the right-view frame for displaying the right-view contents stored in the first buffer; and a period of the left-view frame comprises a second non-display period and the left Vsync period of the left-view frame for displaying the left-view contents stored in the second buffer.

13. The graphics processing apparatus for three-dimensional images of claim 12, wherein the drawing engine draws the right-view contents stored in the first buffer during the second non-display period or during the left Vsync period of the left-view frame.

14. The graphics processing apparatus for three-dimensional images of claim 12, wherein the drawing engine draws the right-view contents stored in the first buffer during the period of the left-view frame.

15. The graphics processing apparatus for three-dimensional images of claim 12, wherein the drawing engine draws the left-view contents stored in the second buffer during the first non-display period or during the right Vsync period of the right-view frame.

16. The graphics processing apparatus for three-dimensional images of claim 12, wherein the drawing engine draws the left-view contents stored in the second buffer during the period of the right-view frame.

* * * * *